US006895669B2

(12) United States Patent
Ito et al.

(10) Patent No.: US 6,895,669 B2
(45) Date of Patent: May 24, 2005

(54) METHOD OF MANUFACTURING AN INK JET HEAD

(75) Inventors: Takeshi Ito, Nishitokyo (JP); Hiroyuki Nomori, Hachigishi (JP)

(73) Assignee: Konica Corporation, Tokyo (JP)

( * ) Notice: Subject to any disclaimer, the term of this patent is extended or adjusted under 35 U.S.C. 154(b) by 67 days.

(21) Appl. No.: 10/357,150

(22) Filed: Feb. 3, 2003

(65) Prior Publication Data

US 2003/0150113 A1 Aug. 14, 2003

(30) Foreign Application Priority Data

Feb. 8, 2002 (JP) ....................................... 2002-032528

(51) Int. Cl.[7] .......................... B21D 53/76; B32B 31/00
(52) U.S. Cl. .......................... 29/890.1; 29/846; 347/20; 347/54; 156/278; 156/295; 156/325
(58) Field of Search ............................ 29/890.1, 25.35, 29/846, 830; 347/69, 20, 54, 93; 156/278, 295, 325

(56) References Cited

U.S. PATENT DOCUMENTS 4,994,825 A * 2/1991 Saito et al. ............... 347/63 X

FOREIGN PATENT DOCUMENTS

JP 2-55126 * 2/1990 ............. 156/278 X

OTHER PUBLICATIONS

Wu et al, "Process Induced Residual Stresses in Isotropically Conductive Adhesive Joints", IEEE Transactions on Components Packaging and Manufacturing Technology, Parc C, vol. 19, Issue 4, pp. 251–256, Oct. 1996.*

Qian et al, "Visco–Elastic–Plastic Behaviors of Polymer–Based Packaging Materials," Proceedings of 3rd International Conference on Adhesive Joining and Coating Technology in Electron Manufacturing 1998, pp. 62–67, Sep. 1998.*

* cited by examiner

*Primary Examiner*—A. Dexter Tugbang
(74) *Attorney, Agent, or Firm*—Frishauf, Holtz, Goodman & Chick, P.C.

(57) ABSTRACT

A method for manufacturing an inkjet head, which jets, by shear deformation of a partition wall, an ink in an ink flow path. The method includes the steps of: forming a metal electrode on a surface of the partition wall; coating an adhesive agent on the cover board; superposing the cover board onto an upper end surface of the partition wall under a condition wherein the hardness of the adhesive agent is not less than $10^5$ dyne/cm$^2$, so that the ink flow path is formed with the partition wall and the cover plate; and pressing the channel board and the cover board under the hardness condition wherein the hardness of the adhesive agent is not less than $10^5$ dyne/cm$^2$ and not greater than $10^9$ dyne/cm$^2$.

8 Claims, 3 Drawing Sheets

METHOD OF MANUFACTURING AN INK JET HEAD

BACKGROUND OF THE INVENTION

The present invention relates to an inkjet head having excellent ink ejection properties and its manufacturing method applying preferable hardening properties and excellent adhesion properties of an adhesive agent.

A shared mode type inkjet head is provided with polarized piezoelectric elements, a channel board having ink flow path sectioned by partition walls, and a cover board bonded on the upper surface of the channel board. The partition walls are made share deformation to jet ink drops from a nozzle connected with the ink flow path and record on a recording medium such as paper and film.

As for the method for bonding the channel board and the cover board, a method in which the channel board and the cover board are superposed and pressed for adhesion after coating the cover board with an adhesive agent is commonly adopted. For the process of adhering plural members by using the adhesive agent, it is known to superpose for adhesion with another member after coating an adhesive agent on a member and making the coated adhesive agent in B-stage, in order for improving the handling properties of the member coated with the adhesive agent. It is considered effective to superpose for adhesion after coating the adhesive agent on the cover board and making the adhesive agent in B-stage, also in the case of bonding the channel board and the cover board. Incidentally, "B-stage" means the half-hardened state of an adhesive agent.

As for the bonding method of the channel board and the cover board, the inventers of the present invention dedicatedly studied the method of superposing and adhering the channel board and the cover board after making the adhesive agent coated on the cover board in B-stage, and found out that various problems are generated caused by the hardness of the adhesive agent while the boards are being superposed and the adhesion being completed.

Namely, when the channel board and the cover board are superposed and pressed for bonding, according to wettability of a metal electrode provided on the surface of the partition wall of the channel board, in cases where hardness of the adhesive agent is not appropriate, the phenomenon is generated that the adhesive agent flow out through the surface of metal electrode. Especially in cases where the metal electrode is formed by vacuum deposition, the tendency of generating the above phenomena is increased. This is because, when forming the metal electrode with vacuum evaporation, a side surface of the partition wall is positioned to be inclined against an evaporation source in order to properly form the metal electrode on the side surface of the partition wall. The metal layer formed with such an inclined deposition tends to be porous and have a columnar structure. Further the metal layer formed with vacuum deposition is very active and has characteristics of high surface wettability. In the case of using such a metal layer as the metal electrode, the adhesive agent coated on the cover board tends to flow out toward the metal electrode during the period from superposing to hardening of the adhesive agent. Since the channel structure forming the ink flow path is extremely fine and the shape of the inkjet head is complicated, the adhesive agent flew out over the channel board can not be cleaned completely even if cleaning is conducted by using organic solvent which dissolve the adhesive agent. Therefore a problem is caused that the adhesive agent flew out over the partition wall and remained on the partition wall after the cleaning causes degradation of ink jetting speed, and moreover, if too much adhesive agent flew out, the amount of adhesive agent at the adhesion area become insufficient resulting in insufficient boning, or in inability of ink jetting.

Further, when the channel board and the cover board are superposed and after that pressed for bonding, if the adhesive agent did not experience the hardness satisfying a prescribed condition, sufficient adhesion can not be obtained and adhesion failure is generated resulting in insufficient bonding, or in inability of ink jetting.

Therefore, the object of the present invention is to provide an inkjet head with excellent ink ejection performance and a manufacturing method for preventing the flow out of adhesive agent over the partition wall of the channel board during the process of bonding the channel board and the cover board.

SUMMARY OF THE INVENTION

The above-mentioned object can be attained by the following structure and by the following method of manufacturing the inkjet head.

(1) A manufacturing method of an inkjet head, which jets, by shear deformation of a partition wall, an ink in an ink flow path constructed with the partition wall of a channel board and a cover board, comprising: forming a metal electrode on a surface of the partition wall; coating an adhesive agent on the cover board; superposing the cover board onto an upper end surface of the partition wall under the state satisfying the following condition 1, so that the ink flow path is formed with the partition wall and the cover plate; and pressing the channel board and the cover board under the state satisfying the following condition 1 all the time, and experiencing the following condition 2, so that an upper end surface of the partition wall and the cover plate are bonded.

(Condition 1)

Hardness of the adhesive agent measured by a viscoelasticity measuring apparatus is not less than $10^5$ dyne/$cm^2$.

(Condition 2)

Hardness of the adhesive agent measured by a viscoelasticity measuring apparatus is not less than $10^5$ dyne/$cm^2$ and not greater than $10^9$ dyne/$cm^2$.

(2) The manufacturing method of an inkjet head described in (1), wherein hardness of the adhesive agent in the condition 2 measured by a viscoelasticity measuring apparatus is not less than $10^6$ dyne/$cm^2$ and not greater than $10^8$ dyne/$cm^2$.

(3) The manufacturing method of an inkjet head described in (2), wherein hardness of the adhesive agent in the condition 1 measured by a viscoelasticity measuring apparatus is not less than $10^6$ dyne/$cm^2$.

(4) The manufacturing method of an inkjet head described in (1), further comprising: bonding two different channel sub-boards constituting the channel board so that polarized directions of the two different sub-boards are opposite with each other, before superposing the cover board; and forming a groove for the ink flow path on the channel board.

(5) The manufacturing method of an inkjet head described in (1), wherein the channel board and the cover board are bonded by pressing with the pressure of 14–20 kg/$cm^2$.

(6) The manufacturing method of an inkjet head described in (1), wherein the process of forming a metal electrode is a process of forming a metal electrode by vacuum evaporation.

(7) The manufacturing method of an inkjet head described in (1), wherein the process of forming a metal electrode is a process of forming a metal electrode on a surface of the partition wall of the channel board made of nonmetallic piezoelectric material.

(8) The manufacturing method of an inkjet head described in (1), wherein the process of coating an adhesive agent on the cover board is a process of coating an adhesive agent on the cover board made of depolarized piezoelectric plate, which is the same kind of piezoelectric plate as used for the channel board.

(9) An inkjet head, which jets, by shear deformation of a partition wall, an ink in an ink flow path, comprising: a channel board having the partition wall; a cover board for constructing the ink flow path cooperating with the channel board; and a metal electrode formed on a surface of the partition wall; wherein, after an adhesive agent is coated on the cover board, the cover board is superposed onto an upper end surface of the partition wall under the state satisfying the following condition 1, so that the ink flow path is formed with the partition wall and the cover plate; and the channel board and the cover board are pressed to be bonded under the state satisfying the following condition 1 all the time, and experiencing the following condition 2.

(Condition 1)

Hardness of the adhesive agent measured by a viscoelasticity measuring apparatus is not less than $10^5$ dyne/cm$^2$.

(Condition 2)

Hardness of the adhesive agent measured by a viscoelasticity measuring apparatus is not less than $10^5$ dyne/cm$^2$ and not greater than $10^9$ dyne/cm$^2$.

(10) The inkjet head described in (9), wherein hardness of the adhesive agent in the condition 2 measured by a viscoelasticity measuring apparatus is not less than $10^6$ dyne/cm$^2$ and not greater than $10^8$ dyne/cm$^2$.

(11) The inkjet head described in (10), wherein hardness of the adhesive agent in the condition 1 measured by a viscoelasticity measuring apparatus is not less than $10^6$ dyne/cm$^2$.

(12) The inkjet head described in (9), wherein the channel board is constituted by bonding two different channel sub-boards so that polarized directions of the two different sub-boards are opposite with each other; and a groove for the ink flow path is formed on the channel board.

(13) The inkjet head described in (9), wherein the channel board and the cover board are bonded by pressing with the pressure of 14–20 kg/cm$^2$.

(14) The inkjet head described in (9), wherein the metal electrode is formed by vacuum evaporation.

(15) The inkjet head described in (9), wherein the channel board is made of nonmetallic piezoelectric material.

(16) The inkjet head of described in (9), wherein the cover board is made of depolarized piezoelectric plate, which is the same kind of piezoelectric plate as used for the channel board.

DETAILED DESCRIPTION OF THE PREFERRED EMBODIMENT

Figure 1:
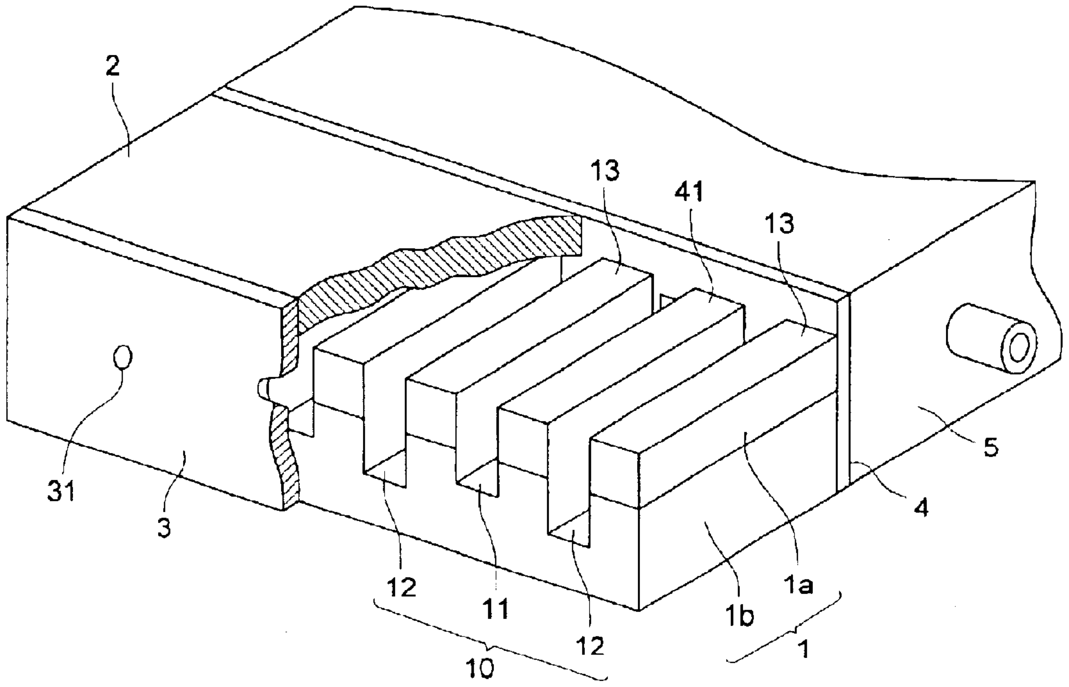
FIG. 1 is a partially broken perspective view of an inkjet head.

Referring to the drawings, the embodiment of the present invention will be explained in the following paragraphs.

Figure 2:
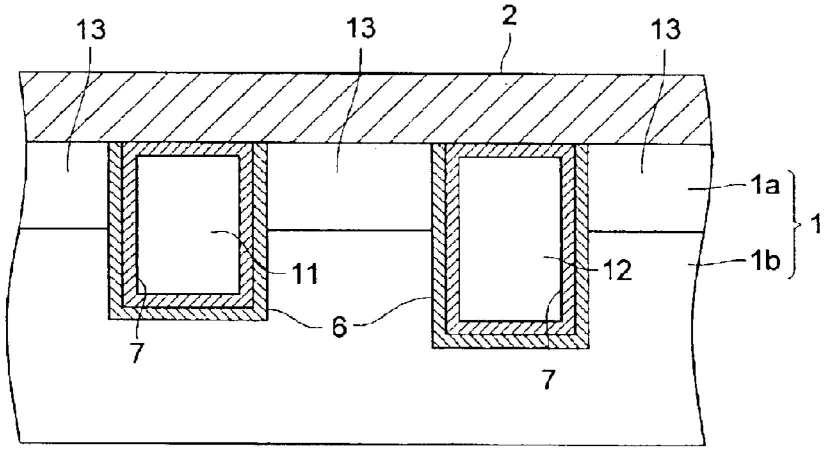
FIG. 2 is a partial sectional view of the inkjet head.

FIG. 1 is a partially broken perspective view showing the outline of an inkjet head, and FIG. 2 is a longitudinal sectional view of the inkjet head. In FIG. 1, 1 denotes a channel board, 2 denotes a cover board, 3 denotes a nozzle plate, 4 denotes a back plate and 5 denotes an ink manifold.

As a piezoelectric material used for the channel board 1, publicly known piezoelectric materials, which deforms by being applied an electric field, such as a board made of organic material and a board made of nonmetallic material can be utilized. The nonmetallic channel board is especially preferable, and there are a piezoelectric ceramics board which is formed through the processes of molding and sintering, and a board which is formed without requiring the process of molding and sintering etc. As the organic material applicable for the organic board, there can be cited an organic polymer such as poly-vinylidenfluoride and the like, and a hybrid material of organic polymer and inorganic material. In the present invention, the preferable piezoelectric material to be used for channel board 1 is a nonmetallic channel board. The reason is that the nonmetallic piezoelectric board such as a piezoelectric ceramics is generally harder, and exhibits the smaller pressure loss at the time generating pressure by deformation, and having high electro-mechanical transforming efficiency.

In the nonmetallic channel board, as the piezoelectric ceramics board being formed through the process of molding and sintering, lead zireonate titanate (PZT) is preferable. Further, $BaTiO_3$, ZnO, $LiNbO_3$, $LiTaO_3$ etc. may be used. As the PZT there are PZT ($PbZrO_3$—$PbTiO^3$) not added with the third component, and PZT added with the third component including $Pb(Mn_{1/3}Sb_{2/3})O_3$ and $Pb(CO_{1/3}Nb_{2/3})O_3$ etc. Further, the nonmetallic channel board, which does not require the process of molding and sintering can be formed, for example, through sol-gel transformation method or laminated plate coating method etc.

Channel board 1 is formed by bonding two channel sub boards 1*a* and 1*b* one above the other in such a manner that the polarizing directions of the two channel sub boards are opposite with each other. As the means for bonding the two channel boards, such as epoxy type adhesive agent and the like is used. The thickness of adhesive agent layer after hardening is preferably in the range of 1–100 μm.

Incidentally, in the present invention, channel board 1 is constructed with two channel sub boards 1*a*, 1*b*, in order to increase share deformation, however, the present invention is not restricted to this construction.

On this channel board 1, by using a publicly known grinding machine such as a dicing blade disc etc. a plurality of parallel groove rows are formed with a prescribed pitch, to form alternately channel section 10 composed of ink channel 11 for being an ink flow path filled with ink and air channel 12 not filled with ink, and partition wall 13 positioned between each channels.

Incidentally, in order for attaining greater effect in the present invention, height of the channels is preferably not less than 50 μm and not more than 500 μm. Further, the aspect ratio of the channels (ratio of height to width) is preferably not less than 1 and not greater than 5.

After forming the groove rows, metal electrode 6 is formed on the side surface of each partition wall 13. As a forming method of this metal electrode 6, publicly known method such as vacuum evaporation method, spattering method and plating method can be used. Since partition walls 13 are consisting of two channel sub boards 1*a* and 1*b* those polarizing direction are opposite with each other, in order to drive both of sub boards 1*a* and 1*b*, each metal electrode 6 is formed on at least entire side surface of each partition wall 13 extending to channel sub boards 1*a* and 1*b* that structure each partition wall 13.

As for the metal used to form metal electrode 6, there are metals containing Au, Pt, Ag, Ni, Co, Cu, or Al etc. as a primary component, but metals containing Al, Ni or Cu as a primary component is preferable, and the metal containing Ni as a primary component is especially preferable. In case of forming electrode 6 by plating method, an electroless plating method is especially preferable. By using the electroless plating method, very uniform and pinhole-free layer can be easily formed. In the electrode forming process by electroless plating, each of Ni—P plating and Ni—B plating can be used by itself, and both Ni—P and Ni—B plating can be overlapped to form a multi-layer. As for the Ni—P plating, since electro-resistivity increases as P content increases, P content is preferably from 1% to several %. Since the B content in Ni—B is usually not more than 1%, Ni content is higher in Ni—B than in Ni-p, and electro-resistivity is lower and connecting properties with external wiring is better in Ni—B than in Ni—P, therefore, Ni—B is better in these properties. However, since the Ni—B is costly, it is also preferable to use by combining Ni—P and Ni—B. Metal electrode 6 formed by electroless plating method using Ni—P or Ni—B has a flat and smooth surface as the result of uniform deposition in the plating process. The thickness of the plating layer is preferably 0.5–5 $\mu$m.

Further, metal electrode 6 can be formed, for example, by applying Ni—P electroless plating on the plating layer formed by Ni—B electroless plating on partition wall 13. Further, in respective electroless plating different metal can be used. Furthermore, electrolytic plating such as gold plating can be applied on the plating layer formed by electroless plating on partition wall 13. Further, metal electrode 6 can be formed by applying electrolytic plating on the metal layer formed by sputtering or vacuum evaporation on partition wall 13.

In the case of forming metal electrode 6 by vacuum evaporation method, after a protection layer is provided on the upper edge surface of partition wall, metal to be the electrode is evaporated from an evaporation source positioned in the plane having a prescribed angle to an extended surface of partition wall 13. By this way, metal is evaporated on the entire side surface of channel sub boards 1*a* and 1*b*, which constitute each partition wall 13. As for the metal to be the electrode, gold, aluminum, and nickel chrome alloy are preferable especially from the points of electric characteristics, corrosion resistance and workability.

After that, on the upper surface of channel board 1 formed with the above-mentioned way, cover board 2 is bonded. As for this cover board 2, using a piezoelectric plate, same material as channel board 1, after depolarization is preferable, because, at the time of bonding, curling, deformation or peeling-off caused by the difference of thermal expansion coefficient hardly occurs. Further non-piezoelectric board with approximately same thermal expansion coefficient can be used. As for the non-piezoelectric board there are for example a ceramics board which is formed through the processes of molding and sintering, and a board which is formed without requiring the process of molding and sintering etc. As the ceramics boards which are formed through the process of molding and sintering, for example, $Al^2O^3$, $SiO^2$, mixture or co-melted body of these, and $ZrO^2$, BeO, AlN, SiC etc. can be used. Further an organic board made of organic material can be used, and an organic polymer or hybrid material of organic polymer and inorganic material can be used as well.

Cannel board 1 and cover board 2 are bonded with using a hardening type adhesive agent. As the hardening type adhesive agent, an epoxy type resin etc. can be cited but not limited to them. As mentioned above, in the present invention, after metal electrode 6 is provided onto the surface of partition wall 13 of channel board 1, an adhesive agent is coated on cover board 2, then in the state that the adhesive agent satisfies the under-mentioned condition 1, said cover board 2 is superposed onto the upper surface of said channel board 1. When said channel board 1 and said cover board 2 are bonded while being pressed, it is characterized that the bonding of said channel board 1 and said cover board 2 is performed under the state that the adhesive agent has experienced the under-mentioned condition 2, as well as satisfies the under-mentioned condition 1.

(Condition 1)

Hardness of the adhesive agent measured by a viscoelasticity measuring apparatus is not less than $10^5$ dyne/cm$^2$.

(Condition 2)

Hardness of the adhesive agent measured by a viscoelasticity measuring apparatus is not less than $10^5$ dyne/cm$^2$ and not greater than $10^9$ dyne/cm$^2$.

In cases where the hardness of the adhesive agent is less than $10^5$ dyne/cm$^2$, when channel board 1 and cover board 2 are superposed, there may be a problem that the adhesive agent flows out onto metal electrode 6. Therefore, the condition 1 is a necessary condition through the time when channel board 1 and cover board 2 are superposed to the time of finishing the bonding.

Further, when channel board 1 and cover board 2 are bonded while being pressed, the adhesive agent is necessary to have an adherence property. In cases where the hardness of the adhesive agent becomes greater than $10^9$ dyne/cm$^2$, adherence property becomes insufficient and results in bonding failure between channel board 1 and cover board 2. If the bonding of the upper part of partition wall 13 is insufficient, when the inkjet head is activated, the generated pressure will be smaller than in cases of sufficient bonding, drive voltage will need to be increased and will be different for each channel. In the worse cases, ink will leak out from ink channel 11 and result in ink jetting failure.

It is more preferable that, as described above, after providing metal electrode 6 on the surface of partition wall 13 of channel board 1, coating the adhesive agent on cover board 2, and in the state that the adhesive agent satisfies the under-described condition 3 superposing cover plate 2 on the upper surface of channel board 1, and when bonding said channel board 1 and said cover board 2 under pressing, the adhesive agent satisfies the under-described condition 3 and also experiences the under-described condition 4 before finishing the bonding.

(Condition 3)

Hardness of the adhesive agent measured by a viscoelasticity measuring apparatus is not less than $10^6$ dyne/cm$^2$.

(Condition 4)

Hardness of the adhesive agent measured by a viscoelasticity measuring apparatus is not less than $10^6$ dyne/cm$^2$ and not greater than $10^8$ dyne/cm$^2$.

After making the adhesive agent in the state of satisfying the above-described condition 1 or more preferably the above described condition 3, when pressing channel board 1 and cover board 2 with superposing, the preferable pressure to be applied is 14–20 kg/cm$^2$. The hardening time period is not limited but preferably is about 30 min.–3 days.

After bonding cover board 2 on channel board 1, forming an insulative protection layer to protect metal electrode 6, at least in ink channel 11 of channel section 10. As for the insulative protection layer, publicly known various materials can be used, and especially, parylene layer can be preferably used. In the embodiment of the present invention, parylene layer 7 is used for the insulative protection layer. By forming parylene layer 7, an aqueous ink become possible to be applied. As for the forming method of this parylene layer 7, a publicly known CVD (Chemical Vapor Deposition) method with the vapor source of solid di-paraxylylene dimer can be used. In this method, radical p-xylylene generated by vaporization and thermal decomposition of di-paraxylilene dimer is adsorbed on a plate and polymerized to form a layer.

In cases where the thickness of parylene layer 7 is less than 1.0 $\mu$m, it becomes difficult to keep sufficient insulating property. According to the increase of the thickness of parylene layer 7, the movement of partition wall 13 is restricted by the rigidity of the layer, therefore, the thickness of parylene layer 7 is preferably 1.0–10 $\mu$m. Specifically, in cases where the thickness is in the range of 1.0–5.0 $\mu$m, parylene layer in ink channel 11 is formed to be as a sufficiently thin layer, and sufficient ink-jetting sensitivity and ink-jetting characteristics can be obtained without decreasing the effective sectional area in ink channel 11. Further preferable thickness range is 1.0–3.0 $\mu$m.

When an air bubble enters into the ink stored in channel 11 in which parylene layer 7 is formed, the air bubble is adsorbed and sticks onto parylene layer 7, and is not easily removed from channel 11. To counter this, it is preferable to apply an oxygen plasma processing on the surface of parylene layer 7, which makes the parylene surface hydrophilic.

After that, nozzle plate 3 having a nozzle hole 31 for jetting ink is bonded at the front edge surface of channel board 1 by using an adhesive agent such as an epoxy type. Further, at the rear edge surface of channel board 1, ink manifold 5, which supplies ink into ink channel 11 through back plate 4 having ink inlet aperture 41, is bonded by using an adhesive agent such as an epoxy type adhesive agent, then an inkjet head is structured.

Although, in the above paragraphs, an example of manufacturing method of the present invention was explained, the present invention can be applied for all the inkjet head manufacturing methods provided that after providing a metal electrode on a partition wall of the channel board, the cover board is bonded on the upper surface of the channel board, while pressing with using adhesive agent, so as to cover the channel section of the channel board.

Although, in the following paragraphs, the present invention will be explained in more detail, the present invention should not be construed to be restricted to any extent to such an example of the embodiment.

EXAMPLE OF THE EMBODIMENT 1

Two PZT plate with respective thickness of 150 $\mu$m and 900 $\mu$m were dipped into insulative oil heated at 150° C., and were polarized by applying 10 KV direct current voltage, after which the two PZT plates were bonded to each other so that polarizing directions of each of the two PZT plates became opposite with each other.

After that, on the surface of the PZT plate, positive type photoregist PMER P-LA 100 (made by Tokyo Ohoka Kogyo) was coated with spin coating so as to make the dried layer thickness of 5 $\mu$m, and after it was cured for 30 min. in the oven of 100° C., an ink channel for ink flow path extending front to rear direction and having a width of 70 mm and a depth of 300 $\mu$m, and an air channel extending also to front to rear direction and having a width of 70 $\mu$m and a depth of 300 $\mu$m, were alternately ground with a pitch of 70 $\mu$m using a diamond blade to form the channel board, and after that grinding swarf was removed by ultrasonic cleaning, after which, Ni—B electroless plating was applied.

In the electroless plating, firstly the channel board was dipped into the 50° C. heated degreasing liquid “PT-0” made by World Metal Corp. (organic acid salt 0.4%+inorganic alkaline salt 0.2%+non-ion activator 0.5%, pH=1) for 30 seconds, and was cleaned. After water washing, the channel board was dipped into the etching liquid “PT-1” made by World Metal corp. (inorganic acid salt 5%+ammonia type sulphate salt 4%+fluorinated salt 1.5%, pH=2) for 30 seconds, and was cleaned. After water washing again, the channel board wad dipped into the stannous chloride solution “PT-3” made by World Metal corp. (organic acid salt 0.4%+inorganic acid salt 0.8%+stannous chloride 0.6%+NaCl 3.5%, pH=1) for 30 seconds and after lightly water washed, the channel board was dipped into the paradium chloride solution “PT-4” made by World Metal corp. (organic acid salt 1%+inorganic acid salt 3%+paradium chloride 0.1%, pH=1) for 45 sec. After water washing this, the processing by “PT-3” and by “PT-4” were repeated again.

Following that, the channel board having been subjected to a pretreatment was applied a plating with a 60° C. heated Ni—B electroless plating solution “Niboron 70” made by World Metal Corp. added with surfactant “AP 555”, while being oscillated in the vertical direction with the speed of 2.5 cm/sec for 20 min. and a plated metal layer with the thickness of 1.5 $\mu$m was formed.

After that, the following steps were performed: removing the resist layer by dipping the channel board into the resist removing liquid “PS” made by Tokyo Ohoka Kogyo, setting the channel board on a sample setting plate made of ceramics such that the plated front wall of the channel board was directed upward, mounting this on a rotatable lapping plate of Hiplus Lapping Machine made by Nippon Engis Co. and grinded the front wall of the channel board for 3 minutes to remove the plated metal while spraying diamond slurry having 3 $\mu$m particle diameter.

After that, the deposited metal on the rear and bottom walls of the channel board were removed by applying YAG laser having the wave length of 532 nm with an energy density of about 50 J/cm$^2$ to form plating removed portions, and by this plating removed portions electrodes are separated by each channel section to form head wiring contact.

In the meantime, the cover board was formed by depolarizing the same piezoelectric plate as the above mentioned channel board.

Preparing ten sets of the channel board and the cover board, coating the under-described adhesive agent on each of the cover plate, and generated several kinds of conditions for the adhesive agent at the time of superposing the cover board onto the channel board, by changing the keeping time at 80° C. after increasing the temperature from a room temperature by the constant rate of 2° C./min, or by changing the keeping time in the room temperature (25° C.) before superposing the cover board onto the channel board. Further, at the time of pressing after superposing, several kinds of conditions are formed, which are different in the hardness of adhesive agent at the time of pressing, by keeping the superposed boards at the room temperature without heating or by controlling the heating temperature after the superposing. The pressure for pressing after superposing the channel board and the cover board was 20 kg/$cm^2$.

(Adhesive Agent 1)

Epoxy Type Adhesive Agent:

Bisphenol-A-diglycidylether (DGEBA)

Dicyandiamide (DICY)

Epoxy-adduct type hardening accelerating agent (Adhesive Agent 2)

Epoxy Type Adhesive Agent:

Bisphenol-A-diglycidylether (DGEBA)

Diethlenetriamine

The conditions of B-stage were measured with viscoelasticity measuring apparatus "ARES" made by Rheometric Scientific Co. However, this viscoelasticity measuring apparatus cannot be used after the cover board is superposed on the channel board. Therefore, in order to confirm the condition of the adhesive agent coated on the cover board to be bonded onto the channel board, measurement jigs were coated with the adhesive agent, and they were kept in the same conditions as the cover board to measure the hardness of the adhesive agent coated on the measurement jigs with the above described viscoelasticity measuring apparatus.

Figure 3:
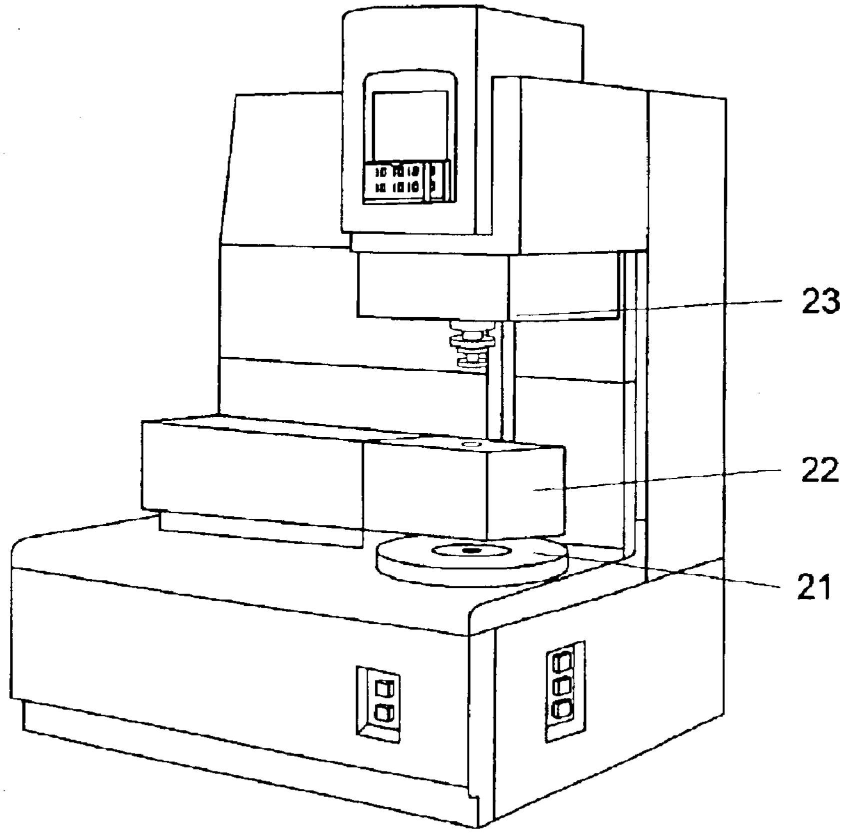
FIG. 3 is a perspective view showing an external view of a measuring instrument of the viscoelasticity measuring apparatus.

FIG. 3 is an external view of a measuring instrument of the viscoelasticity measuring apparatus (ARES). The measuring instrument is composed of a motor 21, a temperature controller 22 and a transducer 23. The transducer comprises a movable stage that is equipped with a controller for controlling the stage and also with a monitor on which the situation can be observed.

Figure 4:
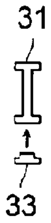
FIGS. 4(*a*) to 4(*e*) are illustrations to explain steps of measuring a viscoelasticity.
Figure 4:
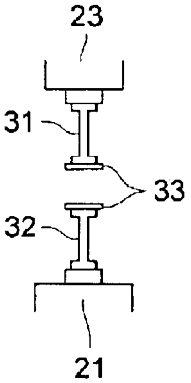
Figure 4:
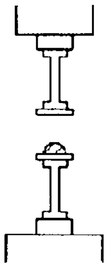
Figure 4:
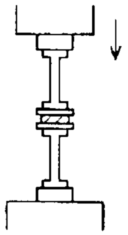
Figure 4:
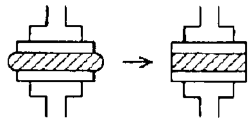

In FIG. 4(*b*), numeral 31 represents a upper bar-shaped jig that is fixed on the part of the transducer 23, 32 represents a lower bar-shaped jig that is fixed on the part of the motor 21 and 33 represents a disk-shaped jig that is fixed on the upper and lower bar-shaped jigs to be used. A diameter of the disk-shaped jig is changed depending on viscosity of adhesive agents to be measured and on a range of hardness to be measured, and a gap relating to measurement is changed.

The measurement is conducted in the following procedure.

1. A disk-shaped jig 33 is fixed on the upper and lower bar-shaped jigs 31 and 32 respectively as shown in FIG. 4(*a*).

2. Upper and lower jigs in which the disk-shaped jig 33 and the upper and lower bar-shaped jig are united in a body solidly are fixed on a clamp face of the motor 21 and the transducer 23 as shown in FIG. 4(*b*).

3. Adhesive agent in an appropriate amount is placed on the lower disk-shaped jig as shown in FIG. 4(*c*).

4. The stage representing the transducer is lowered until adhesive agents are filled in a gap between the upper disk-shaped jig and the lower disk-shaped jig, and the stage is set to form a prescribed gap as shown in FIG. 4(*d*). Adhesive agents which are forced out of the disk-shaped jigs are removed as shown in FIG. 4(*e*).

5. The temperature controller is set, and then, the measurement is started.

In the above measurement, after samples to be measured are filled in a gap formed between disk-shaped jigs each having a certain diameter and a surface that is not rough, a torque applied on the transducer when the disk-shaped jig is rotated by the motor at a certain frequency and a length of a period to the moment when the torque is first applied are detected so that viscoelasticity, hardness and viscosity can be measured.

A diameter and a gap of the disk-shaped jig are determined based on a range of hardness to be measured and on viscosity of the samples to be measured.

After the cover board was bonded onto the channel board, they were cleaned with acetone and their weight before and after the cleaning operation were measured to confirm the existence of un-hardened component of the adhesive agent.

Following that, a parylene layer was provided as a protection layer, a nozzle plate was bonded to the front wall, and the back plate and the manifold were bonded at the rear wall side, and prescribed wiring was attached to form an inkjet head.

The confirmation whether the channel board and the cover board are bonded without fail was accomplished by observing the existence of resonance frequency and by the ink-jetting test.

The method of observing the existence of resonance frequency, is for examining the bonded condition by the existence or absence of a specific resonance frequency, which is verified by the fact that when a voltage is applied on the partition wall of the inkjet head to drive its deformation, the resonance frequency is different with the bonded condition of the cover board. In cases where the existence of the specific resonance frequency is observed, it is indicated that a firm bonding is achieved over the entire inkjet head.

The ink-jetting test was performed by actually jetting ink and measuring the drive voltage when the ink drop speed became 7 m/s, and by comparing the variation of the drive voltage between each channel. When the voltage is low, it is indicated that there is no power loss at the time of partition wall deformation and the power is effectively used for jetting ink, since the cover board is firmly bonded onto the upper surface of the partition wall. This is preferable because of being able to suppress the power consumption. Further, the voltage variation indicates that there is a partial bonding failure between each partition wall of the channel board and the cover board.

Results of the above-mentioned evaluation are shown in Table 1.

Further, ink-jetting tests for 100,000 shots were conducted for the examples 1–6. As the result, as for the examples 1 and 5 there were observed an overall decrease of the jetting speed and an increase in variation between each channel. As for the examples 2–4, and 6 there was observed no deterioration of any ink-jetting characteristic through 100,000 shots, and excellent durability was exhibited.

TABLE 1

| | Hardness by viscoelasticity measuring apparatus (dyne/cm$^2$) | | Weight change | | | |
|---|---|---|---|---|---|---|
| | At super-posing | At pressing | before-after (decreased rate %) | Resonance frequency | Ink-jetting test (V) | Adhesive agent |
| Example 1 | $2 \times 10^8$ | $1 \times 10^5$ | 0.5 | exist | 15.7/ no variation | 1 |
| Example 2 | $1 \times 10^9$ | $1 \times 10^6$ | 0.2 | exist | 15.0/ no variation | 1 |
| Example 3 | $5 \times 10^9$ | $1 \times 10^7$ | ≦0.1 | exist | 14.7/ no variation | 1 |
| Example 4 | $8 \times 10^9$ | $1 \times 10^8$ | ≦0.1 | exist | 14.2/ no variation | 1 |
| Example 5 | $2 \times 10^{10}$ | $1 \times 10^9$ | ≦0.1 | exist | 14.0/ no variation | 1 |
| Example 6 | $1 \times 10^7$ | $1 \times 10^7$ | ≦0.1 | exist | 14.8/ no variation | 2 |
| Reference 1 | $5 \times 10^7$ | $1 \times 10^4$ | 9.6 | exist | 17.2/ large variation | 1 |
| Reference 2 | $1 \times 10^8$ | $9 \times 10^4$ | 5.5 | exist | 16.5/ variation existing | 1 |
| Reference 3 | $9 \times 10^4$ | $9 \times 10^4$ | 0.3 | exist | 16.7/ variation existing | 2 |
| Reference 4 | $3 \times 10^{10}$ | $2 \times 10^9$ | ≦0.1 | partially exist | ≧20/ large variation | 1 |
| Reference 5 | $1 \times 10^{11}$ | $1 \times 10^{10}$ | ≦0.1 | non | not jetted | 1 |

Incidentally, in the Table 1, each of the hardness of the adhesive agent measured by the viscoelasticity measuring apparatus at the time of pressing is shown as a one point value assuming that the each value is approximately even, however, in cases where during the pressing, each of the hardness shown in "at-superposing" column of the Table 1 changed to the value shown in "at-pressing" column due to heating etc after the superposing, and also in cases where after superposing, the pressing was started at the condition of higher hardness of each adhesive agent than at superposing, or after experiencing the higher hardness, and while changing to the value shown in the "at-pressing" column of the Table 1, the pressing for bonding was conducted, for these cases the same results as shown in Table 1 were obtained.

EXAMPLE OF THE EMBODIMENT 2

Since in this embodiment, the forming method of the inkjet head excepting metal electrode is same as that of the example of the embodiment 1, only the forming method of metal electrode and the evaluation for the inkjet head formed by this method are explained hereinafter.

The ink channels and the air channels were formed by grinding the two bonded PZT plates, and after a ultrasonic cleaning, the metal electrode was formed by aluminum vacuum evaporation method.

In the aluminum vacuum evaporation method, initially a protection layer was provided on the upper end surface of each partition wall (the bonding surface with the cover board). After that, evaporating with aluminum, which is to be the electrode, from an evaporating source positioned in the plane having a prescribed angle to the extended plane of the side surface of each partition wall, and the deposition of aluminum was formed on the entire surface of the PZT. After the evaporation, the protection layer on each partition wall was removed. By the above, aluminum electrode was formed on each partition wall with the simple process. In order to form the connecting electrode for connecting the aluminum electrodes formed separately on each of the right and left partition walls of ink channel 11 and air channel 12, after bonding the channel board and the cover board, masking the edge surface of ink supplying side and upper surface of the cover board with a photosensitive resin layer, and aluminum evaporation was applied onto the lower part of the groove wall in channel board 1*b*.

In the same manner as for the example of embodiment 1, the existence of resonances frequency and the result of ink-jetting test are shown in Table 2.

TABLE 2

| | Hardness by viscoelasticity measuring apparatus (dyne/cm$^2$) | | Weight change | | | |
|---|---|---|---|---|---|---|
| | At superposing | At pressing | before-after (decreased rate %) | Resonance frequency | Ink-jetting test (V) | Adhesive agent |
| Example 7 | $2 \times 10^8$ | $1 \times 10^5$ | 0.8 | exist | 18.1 V/ no variation | 1 |
| Example 8 | $1 \times 10^9$ | $1 \times 10^6$ | 0.4 | exist | 17.6 V/ no variation | 1 |
| Example 9 | $5 \times 10^9$ | $1 \times 10^7$ | ≦0.1 | exist | 17.4 V/ no variation | 1 |
| Example 10 | $8 \times 10^9$ | $1 \times 10^8$ | ≦0.1 | exist | 17.1 V/ no variation | 1 |
| Example 11 | $2 \times 10^{10}$ | $1 \times 10^9$ | ≦0.1 | exist | 16.8 V/ no variation | 1 |
| Example 12 | $1 \times 10^7$ | $1 \times 10^7$ | ≦0.1 | exist | 17.4 V/ no variation | 2 |
| Reference 6 | $5 \times 10^7$ | $1 \times 10^4$ | 11.3 | exist | 20.4 V/ large variation | 1 |
| Reference 7 | $1 \times 10^8$ | $9 \times 10^4$ | 7.6 | exist | 19.8 V/ variation existing | 1 |
| Reference 8 | $9 \times 10^4$ | $9 \times 10^4$ | 0.5 | exist | 20.8 V/ variation existing | 2 |
| Reference 9 | $3 \times 10^{10}$ | $2 \times 10^9$ | ≦0.1 | partially exist | 24.6 V/ large variation | 1 |
| Reference 10 | $1 \times 10^{11}$ | $1 \times 10^{10}$ | ≦0.1 | non | not jetted | 1 |

In the above-mentioned embodiments, epoxy type adhesive agent was used for both of adhesive agent 1 and adhesive agent 2, however, the adhesive agent in the present invention should not be restricted to epoxy type, and various types of adhesive agent, which present the B-stage condition, can be applied. It is preferable to use the epoxy type adhesive agent from the point that necessary characteristics for an inkjet head such as ink resistant property and bonding strength can be easily attained. Further, especially in the case of using the channel board made of PZT, in order for preventing adverse effects to the polarized PZT, it is undesirable to keep the channel board in high temperature, and since the epoxy type adhesive agent used in the present embodiment is able to harden in relatively low temperature, it is especially preferable to use the epoxy type adhesive agent.

According to the present invention, an inkjet head with excellent ink-jetting performance can be obtained, and a manufacturing method for preventing the flow out of adhesive agent over the partition wall of the channel board during the process of bonding the channel board and the cover board can be achieved.

What is claimed is:

1. A manufacturing method of an inkjet head, which jets, by shear deformation of a partition wall, an ink in an ink flow path constructed with the partition wall of a channel board and a cover board, comprising:

forming a metal electrode on a surface of the partition wall;

coating an adhesive agent on the cover board;

superposing the cover board onto an upper end surface of the partition wall under a state satisfying condition 1, so that the ink flow path is formed with the partition wall and the cover plate, wherein the condition 1 is that a hardness of the adhesive agent measured by a viscoelasticity measuring apparatus is not less than $10^5$ dyne/cm$^2$; and pressing the channel board and the cover board under a state satisfying the condition 1, and experiencing a condition 2, so that an upper end surface of the partition wall and the cover plate are bonded, wherein the condition 2 is that the hardness of the adhesive agent measured by the viscoelasticity measuring apparatus is not less than $10^5$ dyne/cm$^2$ and not greater than $10^9$ dyne/cm$^2$.

2. The manufacturing method of an inkjet head of claim 1, wherein hardness of the adhesive agent in the condition 2 measured by the viscoelasticity measuring apparatus is not less than $10^6$ dyne/cm$^2$ and not greater than $10^8$ dyne/cm$^2$.

3. The manufacturing method of an inkjet head of claim 2, wherein hardness of the adhesive agent in the condition 1 measured by the viscoelasticity measuring apparatus is not less than $10^6$ dyne/cm$^2$.

4. The manufacturing method of an inkjet head of claim 1, further comprising:

bonding two different channel sub-boards constituting the channel board so that polarized directions of the two different channel sub-boards are opposite with each other, before superposing the cover board; and forming a groove for the ink flow path on the channel board.

5. The manufacturing method of an inkjet head of claim 1, wherein the channel board and the cover board are bonded by pressing with the pressure of 14–20 kg/$cm^2$.

6. The manufacturing method of an inkjet head of claim 1, wherein the process of forming the metal electrode is a process of forming a metal electrode by vacuum evaporation.

7. The manufacturing method of an inkjet head of claim 1, wherein the process of forming the metal electrode is a process of forming the metal electrode on a surface of the partition wall of the channel board made of nonmetallic piezoelectric material.

8. The manufacturing method of an inkjet head of claim 1, wherein the process of coating the adhesive agent on the cover board is a process of coating the adhesive agent on the cover board made of depolarized piezoelectric plate, which is a duplicate of the piezoelectric plate as used for the channel board.

* * * * *